OIL SEPARATOR FOR ROTARY COMPRESSOR

Original Filed March 26, 1968

INVENTORS
LESTER E. HARLIN
WALTER C. MOORE
BY Thomas B. Hunter
ATTORNEY

United States Patent Office

Re. 27,691
Reissued July 3, 1973

27,691

OIL SEPARATOR FOR ROTARY COMPRESSOR

Lester E. Harlin and Walter C. Moore, York, Pa., assignors to Borg-Warner Corp., Chicago, Ill.

Original No. 3,478,957, dated Nov. 18, 1969, Ser. No. 716,067, Mar. 26, 1968. Application for reissue Nov. 4, 1971, Ser. No. 195,666
Int. Cl. F01c *21/04;* F04c *15/00, 29/02*
U.S. Cl. 418—83 5 Claims

Matter enclosed in heavy brackets [ ] appears in the original patent but forms no part of this reissue specification; matter printed in italics indicates the additions made by reissue.

ABSTRACT OF THE DISCLOSURE

Apparatus for separating oil entrained by the refrigerant in the discharge gas of a rotary compressor. This discharge gas, comprising refrigerant and oil, is delivered to a chamber defined in part by a shell enclosing the compressor casing and an oil coalescing medium extending across the shell. This discharge gas sweeps back through substantially the entire surface of the coalescing medium so that the oil droplets are coalesced and returned to the sump. The refrigerant gas passes out of the shell through a conventional discharge line.

[Background and] Summary of the invention

Figure 1:
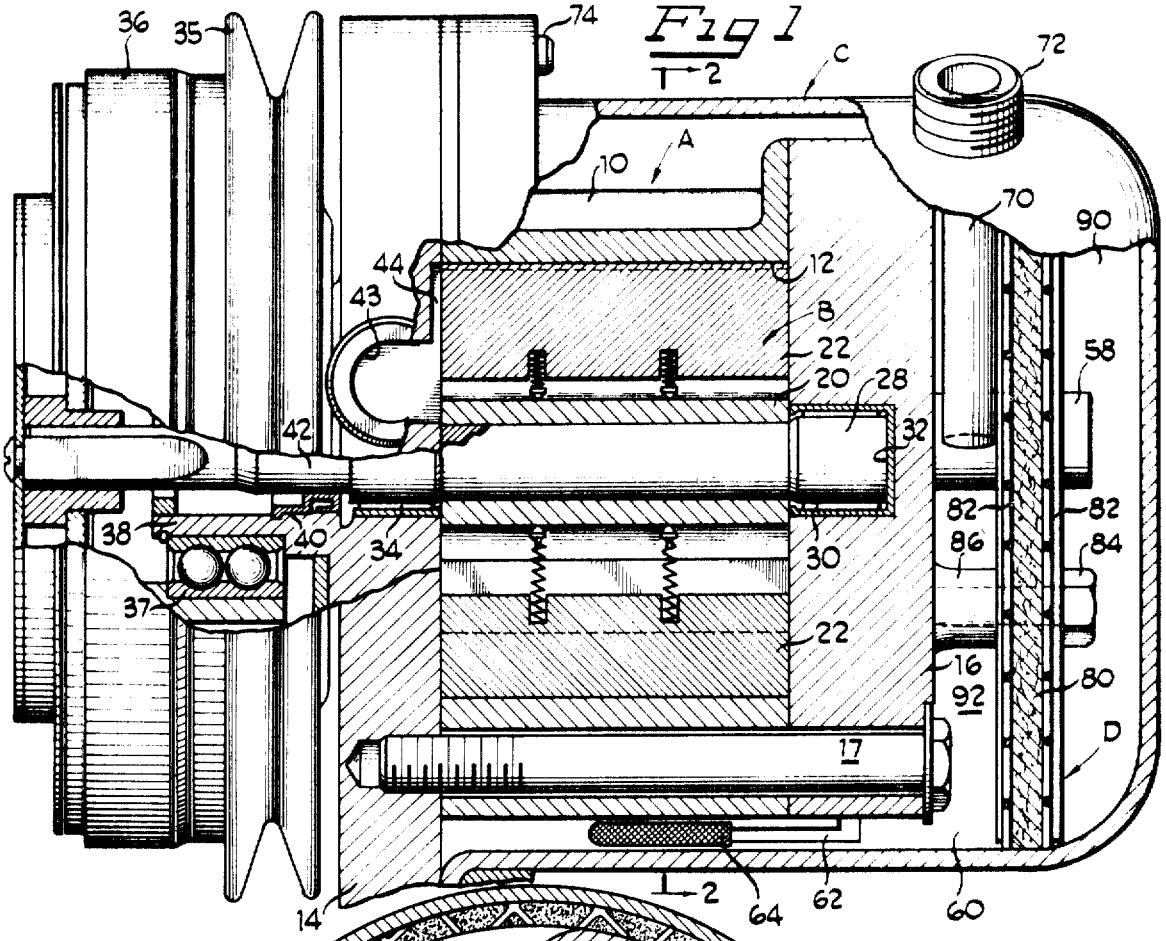

This invention relates generally to refrigerant compressors and more particularly to an improved oil separator for a rotary sliding vane compressor.

As described in U.S. Patent No. 3,258,198 issued to Lester E. Harlin on June 28, 1966, one of the most important problems encountered in the design of a refrigeration compressor is that of effectively removing the oil or other lubricant entrained in the discharge gas. Because the oil is partially miscible with the refrigerant, some flow through the system is unavoidable. However, large quantities of oil flowing out with the refrigerant tends to reduce heat transfer in the condenser and evaporator. Moreover, it is possible under certain conditions to completely starve the compressor of oil which can result in compressor failure.

Accordingly, means such as described in the Harlin patent have been provided to first coalesce the oil and then remove it from the exhaust gas stream. While the oil separator described in the Harlin patent has been found to be useful in certain applications, the construction forming the subject matter of this invention has been found to be superior in many respects. Not only does the oil separator function more efficiently throughout a wide range of capacity settings; but the separator unit can be accommodated in a smaller space. This clearly has an advantage in automotive applications where size and weight are severely restricted.

In the present invention, the compressor casing is enclosed within a shell so that the space between the casing and the shell provides a chamber into which the hot discharge gas is delivered. A coalescing separator extends across the shell so as to define a pair of chambers on either side of separator medium. The discharge gas is directed into the first chamber between the medium and the end of the shell so that it expands into the large volume from a tube connecting it at the discharge port. The gas is directed against the end of the shell; and the drop in velocity accompanying its release into the larger volume tends to free the oil contained in the gas. As the gas deflects from the end of the shell and flows toward the discharge line, the gas sweeps through substantially the entire surface of the coalescing medium. The oil retained on the coalescing medium drains to the oil sump. The discharge line extends well into the shell, so that the gas must change direction quite abruptly. Consequently, any remaining oil is separated from the gas stream and the relatively oil free discharge gas exits out through the discharge line.

The effective use of the area through which the gas sweeps in its passage through the coalescing medium permits a much smaller separator than that which would normally be required to handle the same volume. It is understood that it is virtually impossible to separate all of the oil from the discharge gas but the construction described herein has been found to be more effective than systems presently known.

It is therefore a principal object of this invention to provide a refrigeration rotary compressor which includes an effective and compact oil separator.

Another object of the invention is to provide an oil separator which is specially adapted for use in a rotary sliding vane compressor which inherently carries more oil into the discharge gas stream than a conventional reciprocal compressor.

Additional objects and advantages will become apparent from reading the following detailed description taken in conjunction with the drawings.

Drawings

Figure 2:
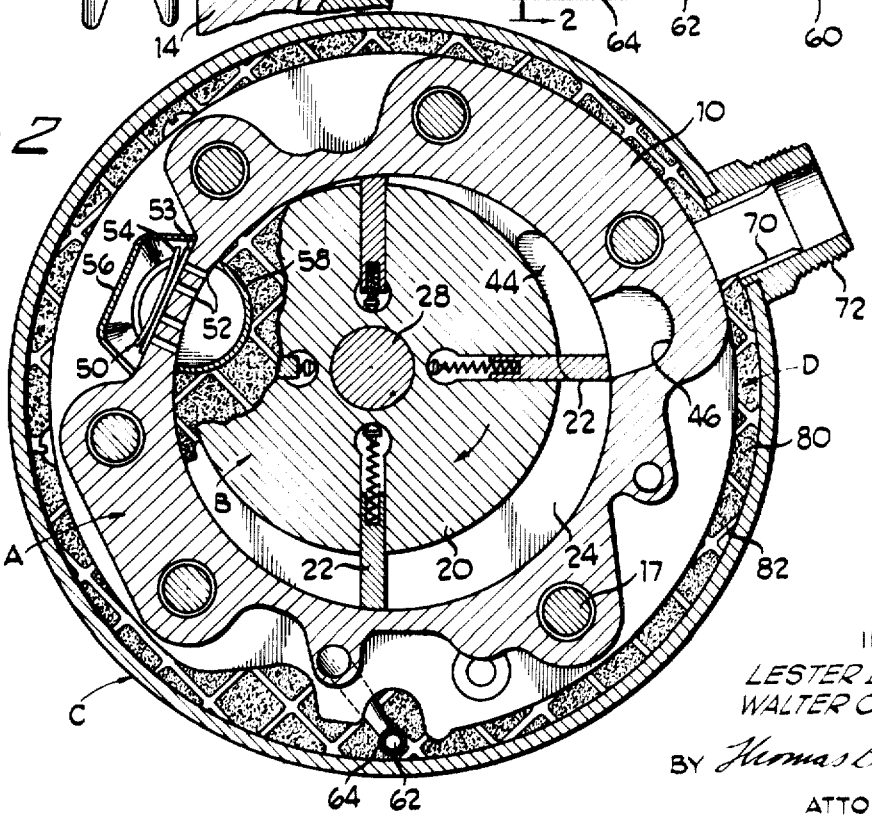

FIGURE 1 is a view, with portions broken away and partly in cross section, of a compressor constructed in accordance with the principles of the present invention; and FIGURE 2 is a cross section view taken along the plane of line 2—2 in FIGURE 1.

Detailed description of the invention

Referring now to the drawings and more particularly to FIGURE 1, the compressor constructed in accordance with the principles of the present invention comprises a housing A containing the rotor assembly B, and a shell C surrounding the compressor and attached to the front bearing plate providing one part of the housing.

The compressor housing A includes a casing 10 having a cylindrical bore 12 extending therethrough, a front bearing plate 14, and a rear bearing plate 16 all secured by capscrews 17. The rotor assembly B is received within the casing bore 12 and includes a slotted rotor 20 which carries a plurality of substantially radially extending and reciprocating vanes 22. This axis of rotor 20 is offset or eccentrically arranged with respect to the axis of the bore 12 so that the bore, the front bearing plate 14, the rear bearing plate 16, and the rotor 20 cooperate to provide a crescent-shaped compression chamber or cavity 24. Rotor 20 is driven by shaft 28 which is journalled in a bearing 30 supported by the rear bearing plate 16 in recessed portion 32 and a bearing 34 supported by the front bearing plate 14.

Inasmuch as the preferred embodiment is especially adapted for automotive use, the compressor rotor is driven by a V-belt pulley 35 through a conventional electromagnetic clutch assembly 36. Pulley 35 is rotataby journalled on a bearing 37, the inner race of which is carried on an axial extension 38 of the front bearing plate 14 and arranged for driving connection with the engine fan belt or accessory drive belt (not shown). The front bearing plate extension 38 is provided with a seal 40 engaging a boss 42 on the drive shaft to prevent loss of refrigerant and lubricant through the front plate journal bearing.

Suction gas from the evaporator (not shown) is admitted to a passage 43 formed in the front bearing plate 14. Both the front bearing plate and the rear bearing plate are provided with generally crescent-shaped recesses 44

(only one of which is shown in FIGURE 2) to admit the suction gas into the suction stage of the compressor cavity 24. The recesses are fluidly interconnected by a channel 46 in the casing body 10.

As the rotor is driven in the direction of the arrow (FIGURE 2), the suction gas is trapped between two vanes and carried forward towards the discharge area. In so doing, the volume between the adjacent vanes is reduced thereby resulting in a corresponding increase in pressure of the gas. A discharge valve assembly 50 is located in the discharge zone. The gas passes through a series of ports 52 in the casing body 10, said ports being covered by a reed-type discharge valve 53, which is held in place by a valve guard or stop 54. A cover member 56 provides a channel for the discharge gas to flow, said channel terminating in a tube or conduit 58 secured to end of cover 56 in such a way that all of the gas must flow out through tube 58. The tube 58 extends through the oil separator D (which will be described in more detail below) into the area enclosed by shell C. The discharge gas is ultimately delivered to a discharge tube 70 secured in a fitting 72 in the shell C.

The oil, which collects in a sump portion 60 in the lower portion of the shell, is circulated through a lubrication system. Oil is caused to flow through a pick-up tube 62 having a strainer 64 to a series of passages in the front and rear bearing plates and the casing body. The details of this system are not necessary for a complete understanding of the present invention.

An important aspect of the present invention relates to the construction of the oil separator and the relationship of the separator D to the compressor and the gas discharge line. As shown best in FIGURE 1, the separator element comprises a body of permeable material 80, for example, one made of coarse mesh metal fibers such as used in a scouring pad which is held between retainers or support members 82. The support members, in the element illustrated in the drawings, comprise a pair of screen-like elements fabricated from heavy metal wire. The periphery of the separator has the same contour as that of the shell so that its edges fit against the internal diameter of shell C, the shell being connected to the periphery of the front bearing plate by a series of capscrews 74 to provide a fluid tight connection between the shell and the front bearing plate. The element is secured in spaced relation to the compressor casing by capscrews 84 or other suitable fasteners which are attached to bosses 86 extending axially from the rear bearing plate 16.

The gas flowing out through the discharge valve assembly 50 is restrained by the cover 56 which is secured to the compressor casing and forms a passageway extending axially toward the end of the shell. The end of the cover is connected to tube 58 which passes through the separator element and into a first chamber 90 defined between the separator element and the end of the shell. The discharge tube 70 extends through the shell and terminates at a point approximately in the center of the shell in the chamber 92 on the opposite side of the separator element. It has been found that the discharge gas tends to swirl quite rapidly causing turbulence and frothing of oil retained in the sump if the discharge line is located at a point other than the center of the shell.

Operation

The operation of the oil separator will now be described. The hot discharge gas, together with the entrained lubricant, passes out through the discharge valve assembly 50 and flows at high velocity through tube 58 into chamber 90. When it reaches chamber 90, the velocity is greatly reduced because of its release into a much larger volume. The gas strikes the end of shell C and reverses direction such that some of the larger droplets of oil adhere to the wall of the shell and flow down into the sump. The gas then flows toward the front of the compressor passing through the oil separator D, during which flow the smaller droplets are coalesced on the permeable pad 80. After passing through the separator, the gas is again caused to change direction in order to pass out the gas discharge tube 70 where it flows to the condenser (not shown). In reversing direction, additional amounts of oil are separated before the gas flows out the discharge line.

While this invention has been described in connection with a certain specific embodiment thereof, it is to be understood that this is by way of illustration and not by way of limitation; and the scope of the appended claims should be construed as broadly as the prior art will permit.

What is claimed is:

1. A compressor comprising a housing having a compression cavity; suction and discharge ports opening into said compression cavity; a rotor in said compression cavity adapted to compress a gaseous fluid introduced through said suction port and discharge it through said discharge port at a higher pressure; a closed shell enveloping said housing; a gas permeable coalescing medium dividing said shell into first and second chambers such that the housing is located entirely within said first chamber; means for delivering the discharge gas directly from said [suction] *discharge* port into said second chamber; and a discharge gas conduit having its [enterance] *entrance* end located in said first chamber, whereby the gas delivered into said [first] *second* chamber must flow through said coalescing medium to reach said entrance.

2. A compressor as defined in claim 1 wherein said discharge gas conduit has an entrance end located substantially in the center of said first chamber.

3. A compressor as defined in claim 2, wherein said discharge gas conduit extends into said shell in a direction generally parallel to the major plane of said coalescing medium.

4. A compressor comprising a housing having a compression cavity; suction and discharge ports opening into said compression cavity; a rotor in said compression cavity adapted to compress a gaseous fluid introduced through said suction port and discharge it through said discharge port at a higher pressure; a closed shell enveloping said housing; a gas permeable coalescing medium arranged within said shell and having its marginal edges closely conforming with the inside diameter of said shell, said coalescing medium being spaced from the end of said shell to provide a partition separating the space enclosed by the shell into first and second chambers such that said housing is located entirely within said first chamber; means defining a fluid passage connecting said suction port with said second chamber for delivering the discharge gas directly from said [suction] *discharge* port into said second chamber; and a discharge gas conduit having its entrance end located in said first chamber whereby the gas delivered into said [first] *second* chamber must flow through said coalescing medium to reach said entrance.

5. A compressor as defined in claim 4 wherein said coalescing medium comprises a generally flat pad of porous metal mesh and rigid retainers of open mesh screening engaging opposite faces thereof.

References Cited

The following references, cited by the Examiner, are of record in the patented file of this patent or the original patent.

UNITED STATES PATENTS

| | | | |
|---|---|---|---|
| 2,606,715 | 8/1952 | Martin | 418—89 |
| 3,074,346 | 1/1963 | Jackson | 417—413 |

CARLTON R. CROYLE, Primary Examiner

J. J. VRABLIK, Assistant Examiner

U.S. Cl. X.R.

418—97